No. 695,848. Patented Mar. 18, 1902.
A. A. VÉREL.
WHEEL.
(Application filed Sept. 6, 1901.)
(No Model.) 2 Sheets—Sheet 1.
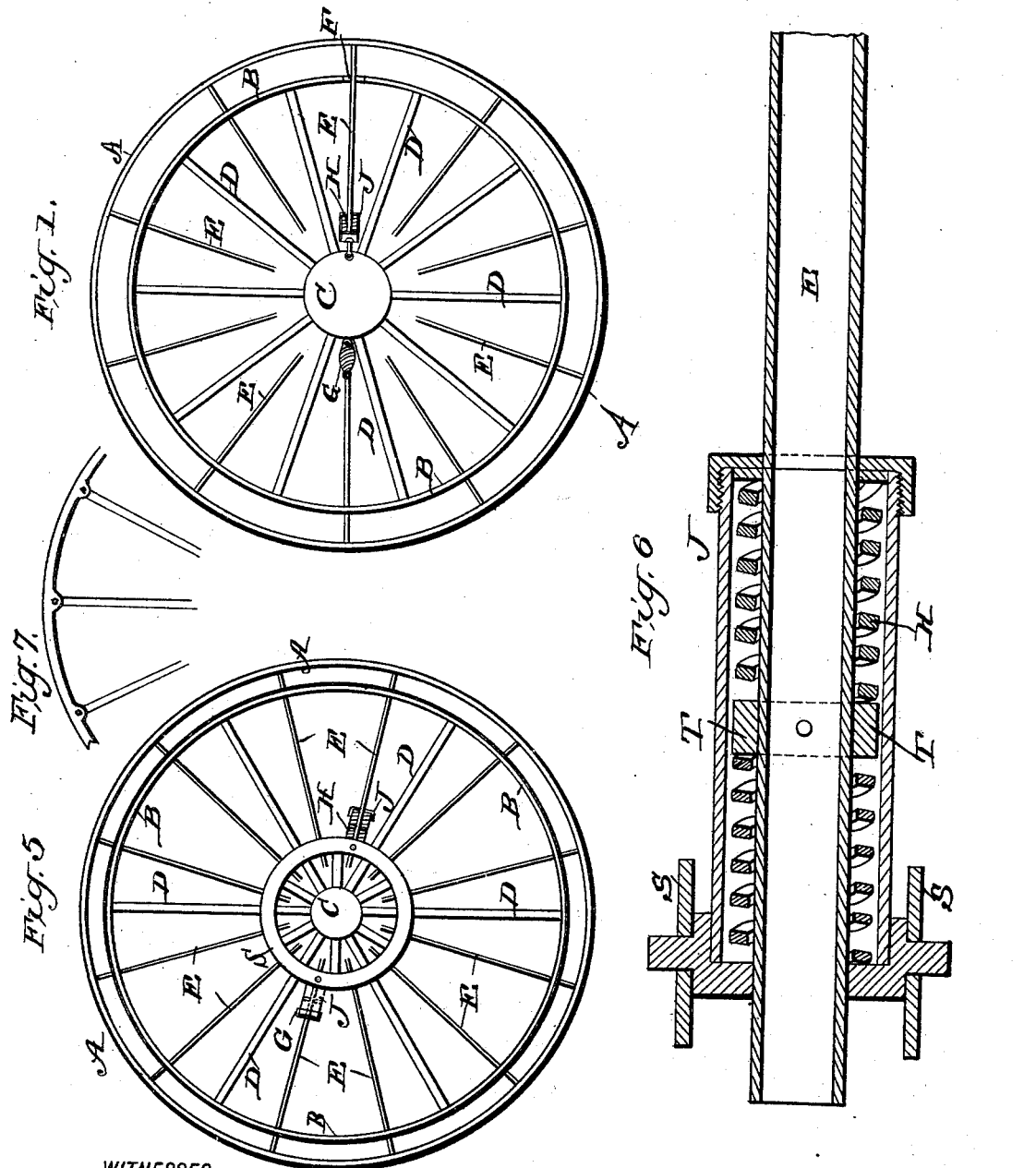
WITNESSES:
W. R. Edelen,
Jos. A. Ryan
INVENTOR
Alphonso A. Vérel
BY Munn & Co.
ATTORNEYS No. 695,848. Patented Mar. 18, 1902.
A. A. VÉREL.
WHEEL.
(Application filed Sept. 6, 1901.)
(No Model.) 2 Sheets—Sheet 2.
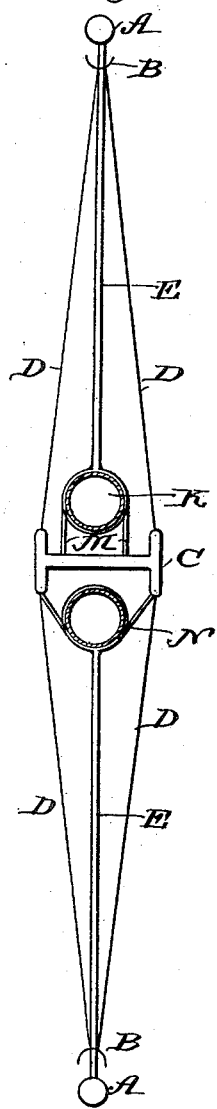
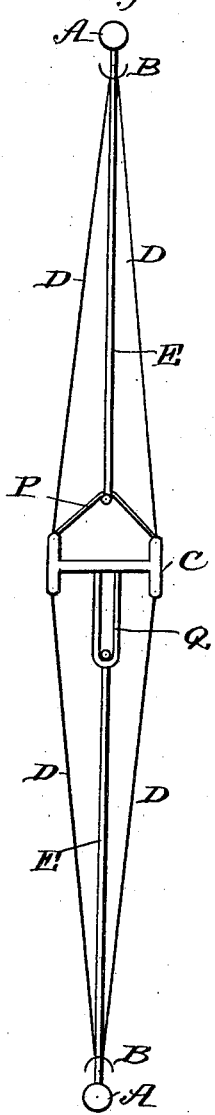
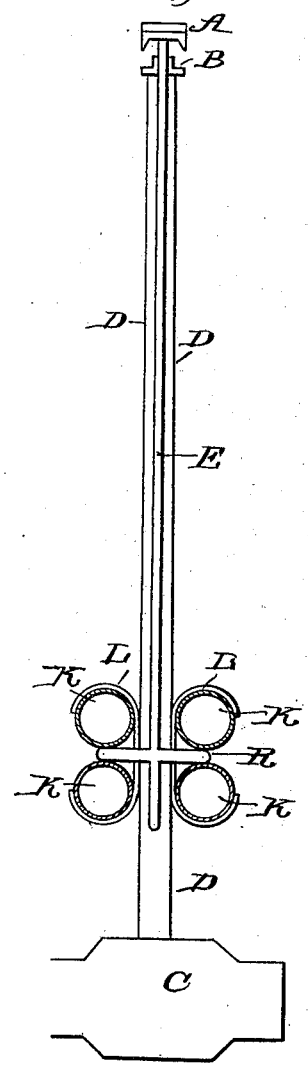
WITNESSES:
W. R. Edelen.
Jos. A. Ryan
INVENTOR
Alphonso A. Vérel
BY Munn & Co.
ATTORNEYS

UNITED STATES PATENT OFFICE.

ALPHONSO ANTHONY VÉREL, OF GLASGOW, SCOTLAND.

WHEEL.

SPECIFICATION forming part of Letters Patent No. 695,848, dated March 18, 1902.

Application filed September 6, 1901. Serial No. 74,553. (No model.)

*To all whom it may concern:*

Be it known that I, ALPHONSO ANTHONY VÉREL, a subject of the King of Great Britain and Ireland, and a resident of Glasgow, Scotland, (whose postal address is 179 West George street, Glasgow, Scotland,) have invented certain Improvements in Wheels, (for which I have applied for British Patent No. 2,821, dated February 9, 1901,) of which the following is a specification.

My said invention is an improvement in wheels for use on carriages, cycles, and the like, and has for its object to provide improved constructions and combinations of parts hereinafter described with reference to the accompanying drawings, in which—

Figure 1 is a side view of a carriage-wheel provided with my improvements. Figs. 2 and 3 are cross-sectional views showing variations of my improvements applicable to cycle-wheels, Fig. 4 being a similar view of a somewhat similar form as applied to a carriage-wheel. Figs. 5 and 6 are respectively side and cross-sectional views illustrating a somewhat different construction, Fig. 6 being drawn to a larger scale than Fig. 5. Fig. 7 is a view illustrating the hinge connection of a spoke with a wheel-rim.

In the construction shown in Fig. 1 I employ an outer rigid ring, felly, or rim A, which may be fitted with any known form of rubber, cushion, or pneumatic tire or tread, (not shown,) and I also arrange an intermediate ring B, with less or greater annular space between it and the outer ring A and between it and the hub or nave C of the wheel. I fix the intermediate ring B rigidly to the hub C of the wheel by spokes D, of metal or wood, and I also secure to the hub spokes E, which extend through openings F in the intermediate ring B to the outer ring A, to which latter they are secured. The openings E through the intermediate ring B are sufficiently enlarged in direction around the ring to accommodate the eccentricity of the hub C relatively to the outer rigid ring A, due to its depression by the weight it carries. In other words, the slots allow space for the spokes E to play with the least possible friction. As shown, the length of the slots is about three times the thickness of the spokes.

The spokes E may be hinged at either their connection with the hub C or the felly A to prevent their being bent by this circumferential movement. The felly-spokes E while free to move through the openings F in the intermediate ring B have springs applied to them on either the inside or outside of that ring, such springs being either conoido-helical springs of metal, such as shown at G, Fig. 1, applied between two parts of the felly-spokes E, one part attached to the hub C and the other part attached to the felly A, or helical springs H, held in a case J, made with a screwed cap, the case being secured to the part of the felly-spoke E attached to the hub C, the other part of the felly-spoke having a head on it bearing on the inner side of the spring H in the case J, or these springs may be of other suitable known form, such as balls, blocks, cords, or strips of rubber. Where strips of rubber are used, they may be applied between the intermediate ring B and the outer felly A, and in that case the felly-spokes E will pass through the intermediate ring B, as described.

In the arrangement shown in Fig. 2 the springs applied to the felly-spokes E are in the form of a pneumatic tube K, which may be strengthened with canvas, the inner ends of the felly-spokes surrounding the tube K, and this tube is connected to the center of the hub C by wires, as shown at M, or to the outer edges, as shown at N, the wires being passed over the tube.

As shown in Fig. 3, the desired spring connection between the felly-spokes E and the hub C is obtained by a band or strip of rubber connected, as shown at P, to both the inner ends of the spokes and to the outer edges of the hub, or the band of rubber may be connected to the center of the hub, as shown at Q. A number of separate connecting-pieces of rubber may be applied instead of a single annular piece.

In Fig. 4 an arrangement of four pneumatic tubes K are shown, these tubes being contained in casings L, fixed to the rigid spokes D, the felly-spokes E having a cross-piece R, which plays between the tubes K to obtain the desired spring connection. In this case the intermediate ring B is shown as being made in two separate sections. Instead of four tubes K two only may be used, one on each side of the rigid spokes D.

In the construction shown in Figs. 5 and 6 a second smaller intermediate ring S is employed, to which ring is secured a number of casings J, corresponding to the number of felly-spokes E, the casings containing springs H and the felly-spokes passing through the casings and having on them a collar T to act on the springs in the desired manner.

In Fig. 7 a spoke is shown hinged to the rim of an ordinary carriage-wheel. For bicycle-wheels the details of construction and arrangement may be varied as conditions require.

What I claim as my invention is—

1. The improved wheel composed of a hub, rigid spokes, and the rim fixed on the latter and having a series of slots, an outer rim separated from the first one, a series of spokes attached to such outer rim and passing through the slots of the inner one, and tension and compression springs applied to the inner ends of such spokes and interposed between them and the hub, substantially as shown and described.

2. The improved wheel composed of a hub, rigid spokes, and a rim fixed thereon and having a series of slots, an outer rim separated from the first one, a series of spokes hinged to such outer rim and passing through the slots of the inner one, and springs connecting their inner ends with the central portion of the wheel, substantially as shown and described.

3. The improved wheel, comprising a hub, spokes fixed thereto, and a rim applied to the spokes and provided with slots, rings secured to the spokes on opposite sides concentrically with the hub, an outer rim separated from the first one, a series of spokes connected therewith and passing through the slots in the inner rim, and springs connecting such spokes with the aforesaid rings, substantially as shown and described.

In testimony whereof I have signed my name to this specification in the presence of two subscribing witnesses.

ALPHONSO ANTHONY VÉREL.

Witnesses:
D. FERGUSON,
GEORGE PATTERSON.